Aug. 3, 1926.
W. R. HUME
1,594,526
MANUFACTURE OF PIPES AND THE LIKE FROM METAL SHEETS OR PLATES
Filed August 28, 1924  2 Sheets-Sheet 1
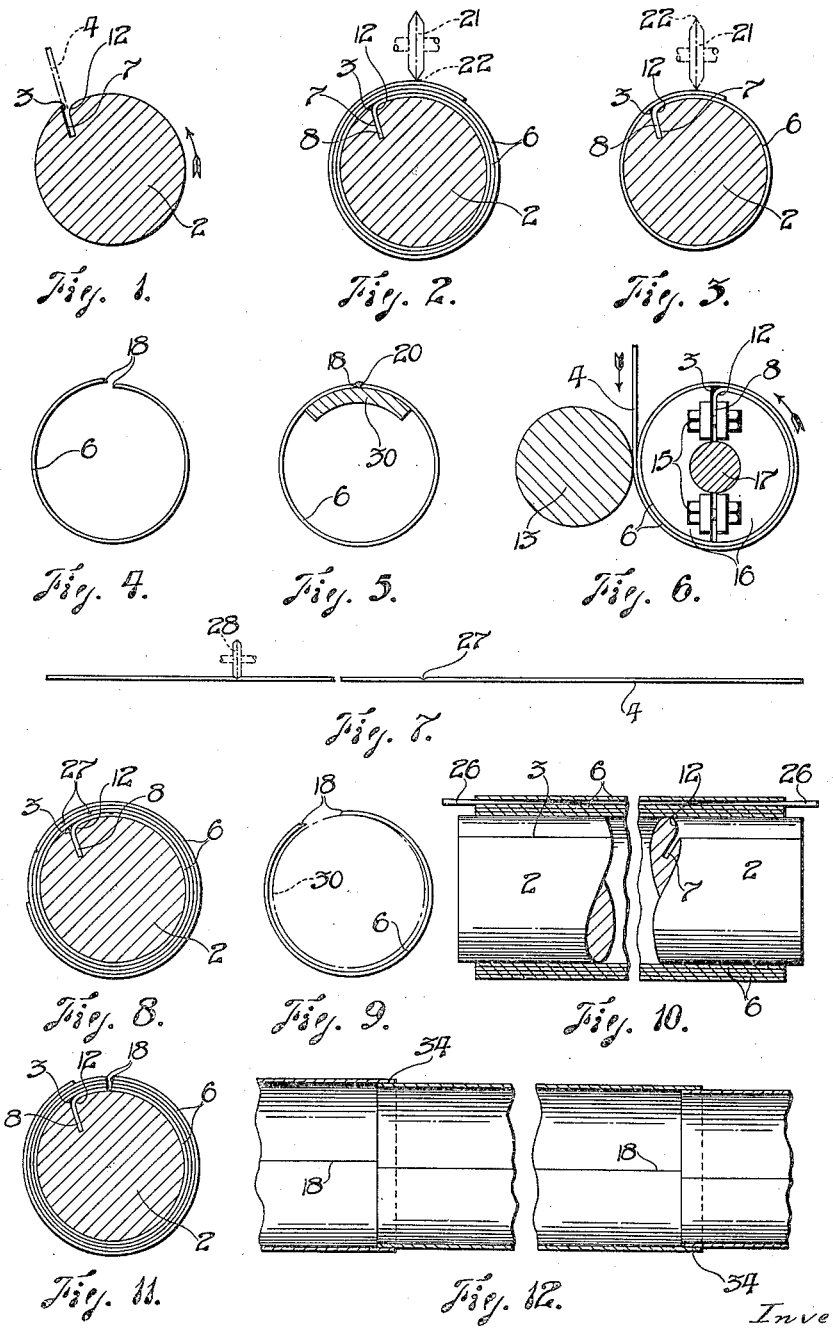

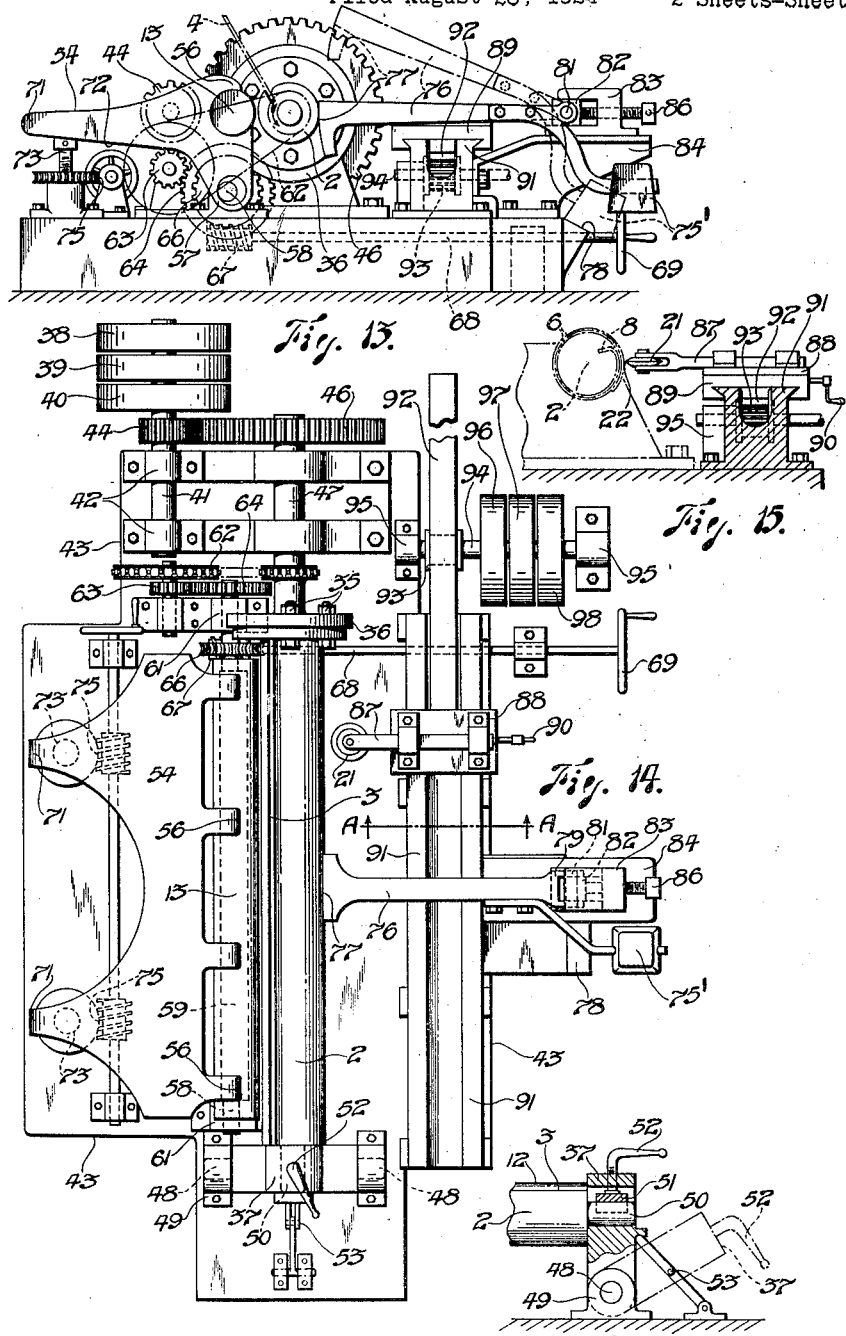

Patented Aug. 3, 1926.

1,594,526

UNITED STATES PATENT OFFICE.

WALTER REGINALD HUME, OF MELBOURNE, VICTORIA, AUSTRALIA.

MANUFACTURE OF PIPES AND THE LIKE FROM METAL SHEETS OR PLATES.

Application filed August 28, 1924, Serial No. 734,717, and in Australia September 19, 1923.

This invention relates to the manufacture of pipes and like tubular articles from sheet or plate metal.

Hitherto it has been the practice to form such tubular articles from flat metal sheets or plates cut to a length approximately equal to the circumference of the pipe or the like to be formed, these sheets or plates being curved to the requisite diameter by a suitable roller or bending machine after which the meeting edges of the sheet are united by welding or other means.

When the tubes or the like are thus formed they occupy excessive space in transport and also require to be handled with reasonable care to avoid denting or other damage thereto. Similarly in transporting the flat sheet metal excessive space is occupied incurring unnecessary expense in freight charges and handling of the material.

The object of the present invention is to provide an improved method and means of manufacturing sheet or plate metal pipes and the like whereby the above objections are overcome and the manufacture of the articles is greatly simplified, cheapened and generally improved.

According to the invention a flat sheet or plate of the metal of any desired width according to the length of the tubes to be formed, is first coiled into a continuous spiral sufficiently long to form one or more preferably a series, of the tubular articles. This spiral coil may be conveniently formed by suitably securing one end of the flat metal sheet or plate to a mandril or roller upon which the sheet is then coiled.

After securing the leading end of the sheet or plate to the mandril as aforesaid said mandril is slowly and powerfully rotated so that the sheet is rolled up tightly upon the mandril until the desired number of convolutions have been formed. The mandril may then be withdrawn as aforesaid from the coiled sheet or plate which is now ready for shipment or transport, the spirals or convolutions of the coil corresponding substantially to a series of partly formed tubes which are packed into the space of one ordinary pipe corresponding in size to the exterior of the coil. The space required for transport is thus reduced to a minimum and owing to the solidity of the coil it can be roughly handled without risk of damage to the material. Alternatively the individual convolutions may be severed from the coil whilst the latter is still on the mandril to thereby form curved pipe blanks as hereinafter described.

To complete the manufacture of tubes from spirally coiled metal sheets or plates as above described the convolutions of the coil are cut or severed longitudinally of the tube to be formed or in the direction of the width of the sheet, so that the severed convolutions may be removed, each individual convolution forming a curved pipe blank. By joining the longitudinal meeting edges of such a curved blank the complete pipe or tube is formed. The various convolutions of the spiral coil may be severed and removed individually or if desired several convolutions may be cut simultaneously from the coiled metal sheet and the individual convolutions subsequently joined at their meeting edges to form tubes or pipes of different diameters.

But in order that this invention may be better understood reference will now be made to the accompanying sheet of drawings which are to be taken as part of this specification and read herewith:—

Figure 1 is a cross section of a mandril having a spiral periphery,

Figure 2 is a similar sectional view showing a metal plate or sheet coiled around the mandril, Figure 3 is a view similar to Figure 2, Figure 4 is an end view of a severed convolution or curved blank, Figure 5 is a cross sectional view, Figure 6 is a cross section showing a metal plate or sheet partially coiled upon a contractible mandril, Figure 7 is a view on a reduced scale illustrating the uncoiled sheet or plate, Figure 8 is a cross section of the mandril, Figure 9 is a sectional view of a curved blank cut from a coiled sheet, Figure 10 is a broken longitudinal section showing the coiled sheet upon the mandril, Figure 11 is a cross sectional view of the coiled sheet upon the mandril, Figure 12 is a broken longitudinal section showing a number of tube sections, Figure 13 is an end view of a suitable machine for carrying the improved method into effect, certain parts of the machine being omitted, Figure 14 is a plan view of the machine in which the parts omitted from Figure 13 are included, Figure 15 is a detail section on line A—A of Figure 14, and Figure 16 is a detail view partly in section of a swinging bearing.

In accordance with the invention the periphery of the roller or mandril 2 is of spiral shape in cross section that is to say that the radial distance between the mean axial centre of the mandril and its periphery increases progressively from its minor to its major radius. The effect of this spirality of the mandril is to produce a step or shoulder 3 between the said minor and major radii, the degree of such spirality being such that the height of said step or shoulder is approximately equal to the thickness of the metal sheet or plate 4 from which the tubes are to be formed. Consequently the major radius of the mandril coincides with the outer surface of the metal sheet where the latter commences its first convolution on the minor radius of the mandril, and each convolution 6 assumes a true spiral formation the presence of any ridges, flat portions or other irregularities in the shape of the convolutions being entirely avoided. For this reason the spiral shape and construction of the mandril is highly important and it has been found that with an ordinary circular roller or mandril satisfactory results cannot be obtained owing to the presence of bumps or irregularities in the coiled sheet where it passes over the leading edge portion which is attached to the mandril.

The mandril 2 is provided with a longitudinal slot or recess 7 which extends a suitable distance inwardly from the periphery of the mandril the width of the slot corresponding approximately to the thickness of the sheet or plate 41. The leading edge 8 of said sheet or an inturned piece or lip attached thereto, is entered into the slot 7 whereby the sheet or plate is held in position on the mandril during the coiling or bending operation. One edge of the open mouthed slot 7 is formed by the aforesaid step or shoulder 3 at the major radius of the spiral periphery of the mandril whilst the opposite edge of the slot is preferably rounded as at 12 so that it merges into the periphery of the mandril at the minor radius of the latter thereby reducing the acuteness of the preliminary bending of the metal plate or sheet 4 and constituting a factor in preventing the formation of irregularities in the convolutions 6.

It will be evident that means other than the slot 7 may be employed for attaching the leading edge portion of the sheet to the mandril adjacent and on the lower side of the step or shoulder 3 so that the convolutions of the coil may lie against said attached leading portion of the sheet without forming projections or irregularities in the coil. For instance, the sheet may be tacked or otherwise temporarily secured to the mandril with its leading edge 8 abutting against or adjoining the step or shoulder 3.

To ensure that the metal sheet or plate is closely wound upon the mandril thus obviating any slackness or space between successive superposed convolutions, a pressure roller 13 as indicated in Figure 6 may be provided and adapted to press the metal sheet 4 towards the mandril 12 during the coiling operation. Provision is made as hereinafter described whereby this pressure roller automatically recedes from the mandril as the latter revolves but at the same time said roller maintains a suitable pressure on the sheet or plate to ensure satisfactory coiling thereof as aforesaid.

If desired the mandril 2 may be of a collapsible or contractible nature for instance by constructing it in two or more longitudinal sections 16 adapted to detachably embrace a central shaft 17 as seen in Figure 6 said sections 16 being clamped or secured together by bolts or the like 15 to thereby grip the shaft 17 and the aforesaid leading edge or inturned lip 8 of the sheet 4. This inturned edge or lip may engage in a longitudinal recess between the mandril sections 16 as shown, said recess being the equivalent of the longitudinal slot or recess 7 formed in the mandril 2 as before mentioned. Thus by manipulation of the clamping devices which secure the mandril sections 16 together said sections may be freed from the central shaft 17 which can then be withdrawn to permit of the contraction of the sections 16 to facilitate removal of the coiled sheet therefrom.

To effect the severing of the separate convolutions to form the curved pipe blanks, the coiled sheet or plate (whilst in position on the mandril 2 or, if desired, after being removed therefrom and placed upon a separate roller or shaft) is subjected to the action of a suitable cutting or severing device such as a saw, milling or other cutter, or an oxy-acetylene or electric arc appliance, which is moved over the outer layer or convolution of the coil in the direction of the length of the tube to be formed or so that one or more complete convolutions are severed and may be removed for jointing together the severed meeting edges 18 of the curved pipe blank thus formed (Figures 4, 5 and 9). For this cutting or severing operation it is considered preferable to employ a rotary cutting tool or wheel 21 as indicated in broken lines in Figures 2 and 3. This rotary tool has a bevelled cutting edge 22 whereby the longitudinal meeting edges of the curved blanks are mutually inclined towards each other so that when placed together they form a V shaped groove which accommodates the molten metal and conduces to the formation of a very effective welded joint as indicated at 20 in Figure 5.

In some instances particularly when it is desired to form a series of pipes of equal diameter from the same coil, parallel grooves or markings 27 Figures 7 and 8 may be formed on the flat sheet or plate 4 at the desired spaced intervals where the convolutions or curved blanks 6 are to be severed from the coil. These grooves or markings may extend completely across the sheet in the direction of the length of the pipes to be formed and may be made for instance with a suitable bevel edged tool or roller 28, indicated by broken lines in Figure 7, said tool being traversed over one side of the sheet or plate 4 whilst it is in the flat state, the sheet being then coiled with its marked side outwards. Thus when a convolution or layer 6 is to be severed from the coil it is merely necessary to pass the aforesaid cutting tool 2J or other severing device along the particular groove or mark 27 on the outer face of the coiled sheet so that the correct predetermined diameter of the finished article is ensured. By the use of a bevel edged marking tool as above mentioned a shallow V-shaped groove may be formed so that the longitudinal meeting edges of the curved blanks, which are severed along these grooves, will be mutually inclined towards each other to facilitate the formation and increase the efficiency of the welded joint 20, as previously mentioned.

In order to prevent damage to the underlying convolutions or layers of the coil during said severing operation particularly in the event of this operation being effected by an oxy-acetylene, electric arc or like appliance, the outer convolution or convolutions being severed may be spaced or parted in a radial direction from the next underlying convolution by any suitable means, such for instance, as by wedges 26 inserted between the convolutions 6 at the ends of the coil as seen in Figure 10.

As each convolution or curved blank 6 is thus severed from the coil it may be placed around an internal form or bearer which may be of cylindrical or other shape and size corresponding substantially to the shape and size or other form of the tubular article to be formed as indicated by broken lines at 30 in Figure 9. Or the said form or bearer 30 may be of segmental or like shape and extend only partially around the interior of the tube as in Figure 5. The meeting edges 18 of the curved blank are brought together around this form or bearer 30 and suitably united preferably by electrically welding as indicated at 20 in Figure 5 to thereby complete the formation of the tube which may then be removed from the internal form or bearer.

The tubes thus constructed may be subsequently joined together at their ends where they are united circumferentially by welding or other suitable means to form conduits of the desired length.

Instead of covering the convolutions 6 separately and at different points in the spiral coil as described with reference to Figures 8, 9 and 10, a series of the superposed convolutions may be severed at the same point and if desired simultaneously thereby forming a plurality of curved blanks of different sizes. These blanks are adapted to form tubes of progressively decreasing diameters which may be readily fitted and secured together with their ends neatly accommodated one within the other as indicated at 34 in Figure 12. By this means tapering tubes or pipes may be readily and economically constructed such tapered tubes being admirably suited for use as tramway or telegraph posts and various other purposes.

It will be obvious that the interfitting ends 34 of the tube sections may be secured together in a circumferential direction by welding, rivetting, or other suitable means to thereby form a pole or the like of the desired length.

It will be evident from Figure 3 that a single tube may be constructed in accordance with the invention by forming a single spiral convolution about the mandril 2 the inbent leading edge or end 8 of the sheet being overlapped by the trailing end so that by cutting through the two superposed layers or severing the inner layer along the trailing edge of the coiled sheet, the meeting edges of the resultant curved blank may be joined together to form the complete tube as before mentioned.

Reference will now be made to Figures 13–16 of the accompanying drawings which illustrate, by way of example, a suitable machine or apparatus for carrying the improved method into effect. According thereto the spiral mandril 2 is secured at one end by bolts 35 to a rotary face plate or chuck 36 and is supported at its other end by a bearing 37 as hereinafter described. The power transmission mechanism for rotating the mandril may include forward, loose and reverse pulleys 38, 39 and 40 mounted on a main driving shaft 41 which is supported by bearings 42 secured to a suitable base or foundation indicated in general by the numeral 43. Reduction gearing which may comprise a train of toothed wheels as 44 and 46 is provided between the main driving shaft 41 and a shaft 47 which carries the face plate or chuck 36 whereby the spiral mandril is rotated at a speed suitable for effective working. During coiling operations the mandril is rotated in the direction indicated by the arrow in Figure 13.

The aforesaid bearing 37 may carry sidewardly projecting horizontal trunnions or pivot pins 48 which are accommodated by suitable brackets 49 so that the said bearing 37 may be swung downwardly, as indicated by the broken lines in Figure 16, from its normal upright attitude when it is desired to remove a coiled sheet or plate from the mandril. In order to free the mandril from its bearing 37 preparatory to displacement of the latter as abovementioned, a loose bearing block 51, which is normally in operative position around the upper part of the adjacent reduced end portion 50 of the mandril, may be released therefrom by manipulation of a presser screw 52. The swivelling bearing may be maintained in its upright position about the pivot 48 by means of toggle links 53 which normally engage a stop or projection on the bearing 37 as in Figure 16 and may be collapsed when desired.

The aforesaid pressure roller 13, which is provided to ensure that the metal sheet or plate 4 is closely wound or coiled around the mandril as previously mentioned, is carried by a suitable frame 54 which prevents bending or distortion of the pressure roller and keeps it close up to the work during the coiling of the sheet or plate around the mandril 2. For this purpose the frame 54 may have jaw like projections 56 which partly embrace the roller 13 and form aligned bearings or seatings in which the roller is free to turn. Owing to the spirality of the mandril it is desirable that the pressure roller 13 should recede therefrom during coiling of the metal sheet or plate. For this reason the roller supporting frame 54 may be provided with apertured lugs or bosses 57 through which passes the eccentric portion 58 of a shaft 59 which turns in suitable bearings 61.

This eccentric shaft 59 may be turned in the desired direction and at an appropriate slow speed by means of suitable operative connections such as reduction gearing actuated from the shaft 47. Such reduction gearing may comprise a chain or endless band drive indicated at 62 and toothed wheels 63 and 64 the last wheel of the train being mounted on the eccentric shaft 59. By such means the pressure roller is caused to automatically and gradually recede from the spiral mandril as the latter revolves, each complete revolution of the mandril causing the roller 13 to recede for a distance corresponding to the thickness of the sheet or plate being coiled around the mandril. To return the pressure roller to its starting position after removal of the coiled sheet from the mandril the eccentric shaft 59 may be rotated in the opposite direction by means of a worm wheel 66 carried by the shaft 59 and turned by a worm screw 67 on a spindle 68 which is provided with an operating hand wheel or the like 69.

The pressure roller supporting frame 54 may be provided with rearwardly or sidewardly extending portions 71 having inclined lower faces 72 which bear freely upon and slide over vertically adjustable supports or jacks 73 during the movement of said frame. These supports or jacks may be raised and lowered by hand operated worm wheel and screw gear indicated at 75 so that besides supporting the swinging frame 54 about the eccentric shaft 59 relatively fine adjustments may be made in the position of the pressure roller 13 relative to the spiral mandrel 2.

To prevent bending or distortion of the spiral mandrel during the initial engagement of the metal sheet 4 with the pressure roller, a pivoted arm or strut 76 is adapted to bear against the periphery of the mandrel on the opposite side to the pressure roller 13 and approximately intermediately of the length of the mandrel. The forward end or contact face 77 of this strut is curved from the top to bottom, the degree of such curvature and the pivotal point of the arm or strut being so designed and arranged in relation to the spiral periphery of the mandrel 2 that as the latter rotates it raises the strut 76 by frictional contact. When the strut has been thus raised clear of the mandrel a weight 75' attached to the arm or strut behind its pivotal point 81 causes the curved forward end of the strut to be raised farther as indicated by broken lines in Figure 13 so that it does not interfere with the continued rotation of the mandrel and the coiling of the metal sheet thereon. A stop 78 may be provided to limit such swinging movement of the pivoted strut.

The rear end 79 of the strut 76 may be forked or bifurcated as in Figure 14 and adapted to embrace a pivot pin 81 which passes through a bearing block 82. This block may be accommodated by a horizontal slideway formed in a bracket 83 mounted on a supporting member 84 which upstands from the foundation 43. By the provision of an adjusting screw 86 the sliding block 82 may be adjusted towards or from the mandrel 2 according to the diameter of the particular mandrel in use so that the curved face 77 of the strut may be properly engaged with the mandrel when commencing the coiling operation.

The aforesaid bevel edged cutting tool or wheel 21 by which the convolutions are severed from the coiled sheet, may be mounted at one end of a tool holder 87 (Figures 14 and 15) attached to a laterally adjustable slide 88 carried by a longitudinally travelling carriage or saddle 89. Screw and nut mechanism or the like operable by the handle 90 may be provided to move the slide 88 laterally in relation to said travelling carriage or saddle so that the cutter may be advanced towards or withdrawn from the coiled sheet as desired. The travelling carriage 89 is adapted to move along a stationary guide member 91 which extends longitudinally of and at one side of the mandrel 2. Means for actuating the travelling carriage may include a toothed rack 92 which is attached to said carriage and meshes with a corresponding toothed pinion 93. This pinion is mounted on a shaft 94 supported by bearings 95 and provided with forward, loose and reverse pulleys 96, 97 and 98 whereby the desired motion may be transmitted to the carriage 89.

It will be obvious that in instances where the coiled sheet or plate is removed from the mandrel 2 and placed around a shaft or roller preparatory to the severing of the convolutions as hereinbefore mentioned, cutting mechanism similar to that described in the last preceding paragraph may be employed and arranged to travel longitudinally of the said shaft or roller carrying the spiral coil.

By the invention important advantages may be attained in connection with the saving of space in transport and consequent reduction of freight charges as previously mentioned. In addition the manufacture of the tubular articles is greatly facilitated, cheapened and generally improved. It will, of course, be obvious that the successive operations of spirally coiling the metal sheets or plates, severing the individual convolutions and joining together the meeting edges of the resultant curved blanks, may be carried out on the same site or by the same staff of operatives instead of transporting the metal sheets in the coiled form as before mentioned. Similarly the curved blanks may, if desired, be packed one within the other so that they occupy little space and may be thus stored and transported for subsequent formation into the completed tubes.

Having now described my invention what I claim as new and desire to secure by Letters Patent is:—

1. An improved method of manufacturing pipes and the like from metal sheets or plates comprising the steps of spirally coiling a metal sheet, cutting through or severing the spirally coiled metal sheet in the direction of the length of the pipe to be formed thereby producing a curved pipe blank, and joining together the severed meeting edges of said blank.

2. An improved method of manufacturing pipes and the like from metal sheets or plates comprising the steps of spirally coiling a metal sheet, cutting through or severing the superposed convolutions or layers of the spirally coiled metal sheet in the direction of the length of the pipes to be formed thereby producing a series of curved blanks corresponding to said convolutions, separating said blanks from each other, and subsequently joining together the severed meeting edges of the respective blanks.

3. An improved method of manufacturing pipes and the like from metal sheets or plates comprising the steps of spirally coiling a metal sheet, severing the various superposed convolutions or layers of the spirally coiled metal sheet in the direction of the length of the pipe to be formed and at the same circumferential point on the coil to thereby form a series of curved blanks of progressively decreasing size or radius, and uniting the severed meeting edges of said blanks.

4. An improved method of manufacturing pipes and the like from metal sheets or plates comprising the steps of spirally coiling a metal sheet, severing the spirally coiled metal sheet in the direction of the length of the pipe to be formed thereby producing a curved pipe blank, placing said curved blank around an internal former or bearer, bringing together the severed meeting edges of the blank upon said former or bearer, uniting said meeting edges to form a complete pipe, and removing the pipe from said former or bearer.

5. An improved method of manufacturing pipes and the like from metal sheets or plates comprising the steps of spirally coiling a metal sheet, severing the various superposed convolutions or layers of the spirally coiled metal sheet in the direction of the length of the pipes to be formed and at the same circumferential point on the coil to thereby form a series of curved blanks of progressively decreasing size or radius, uniting the severed meeting edges of said curved blanks to thereby form a series of complete tubes of progressively decreasing diameters, fitting the ends of said tubes one within the other, and securing said interfitting ends together to form a tapered pipe or pole.

6. An improved method of manufacturing pipes and the like from metal sheets or plates comprising the steps of spirally coiling a metal sheet, severing the spirally coiled metal sheet in the direction of the length of the pipe to be formed thereby producing a curved pipe blank corresponding to a convolution of the coil, beveling the longitudinal meeting edges of said blank inwardly towards each other during said severing operation, bringing together said beveled meeting edges of the blank so as to form a longitudinal groove between said edges, and welding said edges to form a complete tubular article in which the welding metal is accommodated by said groove.

7. An improved method of manufacturing pipes and the like from metal sheets or plates comprising the steps of spirally coiling a metal sheet, passing a cutter having a beveled or V shape cutting edge over the spirally coiled metal sheet in the direction of the length of the pipe to be formed thereby producing a curved pipe blank corresponding to a convolution of the coil and simultaneously beveling the longitudinal meeting edges of said blank inwardly towards each other by said cutting operation, and welding together said beveled meeting edges of the resultant blank to thereby form a complete tubular article in which the welding metal is accommodated between said beveled edges.

8. An improved method of manufacturing pipes and the like from metal sheets or plates comprising the steps of coiling the sheet or plate into the form of a spiral having a series of complete convolutions, severing said convolutions in the direction of the length of the pipes to be formed thereby producing a series of curved pipe blanks each corresponding to a complete convolution of the coil, and welding together the severed longitudinal meeting edges of said blanks to form a series of complete pipes or tubes from the same coil.

9. An improved method of manufacturing pipes and the like from metal sheets or plates comprising the steps of coiling the sheet or plate upon a mandril to form a series of superposed spiral convolutions, severing the various convolutions in the direction of the length of the pipes to be formed thereby producing a series of curved pipe blanks each corresponding to a complete convolution of the coil, separating said blanks from each other, and welding together the severed longitudinal meeting edges of said blanks to form a series of complete pipes or tubes from the same coil.

10. An improved method of manufacturing pipes from metal sheets or plates comprising the steps of attaching an edge of the metal sheet to a mandril, rotating said mandril to thereby form complete spiral convolutions, severing said convolutions in the direction of the length of the pipes to be formed, thereby producing one or more curved pipe blanks, parting said attached edge of the sheet from said blank or blanks, separating the severed blanks from each other, and welding together the longitudinal meeting edges of the individual curved blanks to form a complete pipe or pipes.

11. An improved method of manufacturing pipes from metal sheets and plates comprising the steps of coiling the sheet around a mandril, longitudinally cutting the convolutions of the sheet, removing the cut sheet from the mandril, and joining the cut portions of the sheet together to form the pipe.

In testimony whereof I hereunto affix my signature.

W. R. HUME.